Dec. 30, 1941. F. F. WAECHTER 2,268,530
SEALING MEANS FOR BINS, BUNKERS, OR THE LIKE
Filed Feb. 23, 1940 5 Sheets-Sheet 2

Inventor
Ferdinand F. Waechter
Attorney

Dec. 30, 1941.   F. F. WAECHTER   2,268,530
SEALING MEANS FOR BINS, BUNKERS, OR THE LIKE
Filed Feb. 23, 1940   5 Sheets-Sheet 4

Inventor
Ferdinand F. Waechter
By L. Donald Unger
Attorney

Patented Dec. 30, 1941

2,268,530

UNITED STATES PATENT OFFICE 2,268,530

SEALING MEANS FOR BINS, BUNKERS, OR THE LIKE

Ferdinand F. Waechter, Philadelphia, Pa., assignor to Link-Belt Company, a corporation of Illinois Application February 23, 1940, Serial No. 320,503

25 Claims. (Cl. 214—17)

This invention relates to new and useful improvements in means for sealing the openings through which coal, or other dusty material, is fed to bins, bunkers, or other enclosures by means of traveling belt conveyor trippers, or other traveling material delivering devices.

As an example of one application of the invention, the coal handling equipment of power houses usually includes a row or series of bunkers, each having a coal admitting opening arranged in alignment, or a relatively long bunker which is provided with two or more aligned openings. The coal is fed from the bunker or bunkers to the fire boxes of the boilers. The proper supply of coal is maintained in the bunker or bunkers by means of suitable conveyor mechanism which usually includes a belt conveyor that carries the coal to the series of bunker openings and selectively discharges the coal through the same by means of a traveling tripper. The bituminous coal, which is commonly employed for firing large boilers, cannot be served to the bunker or bunkers, by the tripper, without giving rise to a cloud of coal dust. If the bunkers are left uncovered, the coal dust released during the charging operation inevitably will be distributed over a considerable area. This, of course, is an extremely undesirable condition and often creates a nuisance for surrounding property owners.

The problem of covering or sealing bins or bunkers served by traveling belt conveyor trippers is a difficult one to solve economically because of the need of providing a material admitting opening for each enclosure which may be sealed with respect to the discharge end of the moving tripper chute; which will traverse the top of the enclosure as the tripper travels relative thereto, i. e., open up in advance of the moving tripper chute and close in back of the chute; and which will be completely closed when the tripper is not in discharging relation with respect to the particular bin or bunker of the opening being considered.

It is the primary object of this invention to provide means for covering or sealing bins, bunkers, or other enclosures, against the release of dust either during or between periods of delivery of materials thereto by means of a traveling belt conveyor tripper, or other traveling material delivering devices.

A further important object of the invention is to provide relatively inexpensive means for sealing or closing the material admitting openings of bins, bunkers, enclosures, or the like, while material is being discharged through said openings by means of moving chutes which form a part of a traveling belt conveyor tripper, or other traveling material delivering devices.

Other objects and advantages of the invention will be apparent during the course of the following description.

In the accompanying drawings forming a part of this specification and in which like numerals are employed to designate like parts throughout the same.

Figure 1:
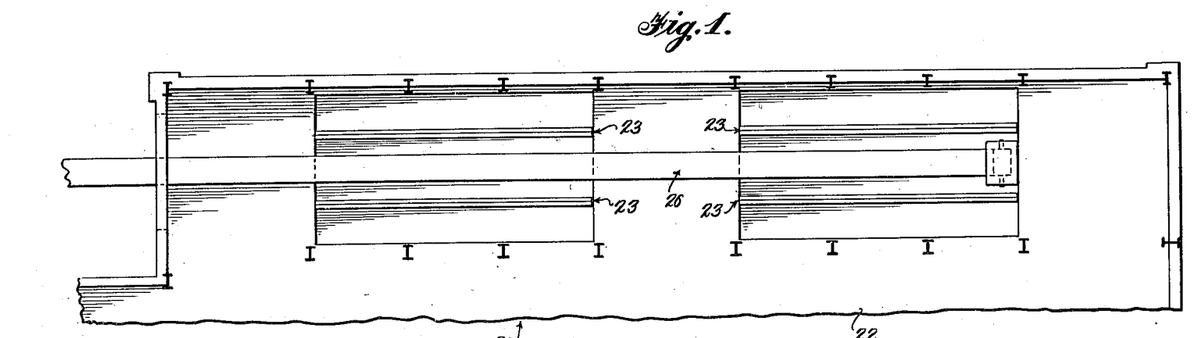
Figure 1 is a partial plan view of the feed slots, or elongated openings, which serve one or two bins or bunkers employed in connection with the storage of coal for power houses.
Figure 2:
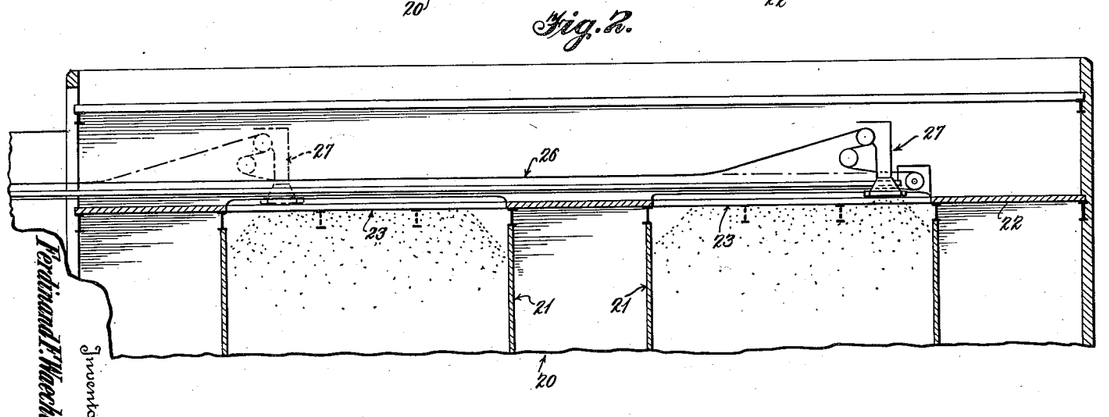
Figure 2 is a vertical sectional view showing the feed slots or openings of Fig. 1 operatively associated with two bins or bunkers and having a traveling belt conveyor tripper arranged to serve the same.

In the drawings, wherein for the purpose of illustration are shown the preferred embodiments of this invention, and first particularly referring to Figs. 1 to 4, inclusive, the reference character 20 designates in its entirety a building structure which is associated with or enclosed one or more bins or bunkers 21, see Fig. 2, which are intended to confine either coal for the boilers of a power house, or any other dusty materials which should be confined in enclosures. A suitable top, or flooring, 22 overlies the bins or bunkers 21. In the particular illustration set forth in Figs. 1 to 4, inclusive, each bin or bunker 21 is provided with a pair of parallel slots or elongated openings 23. Although Figs. 1 and 2 disclose two separate bins or bunkers 21 served by a pair of openings 23 for each bin or bunker, it is to be understood that larger and/or a greater number of bins may be provided or employed and each bin be served by either two or more pairs of feed openings or two or more openings arranged in a single line or series.

Figure 3:
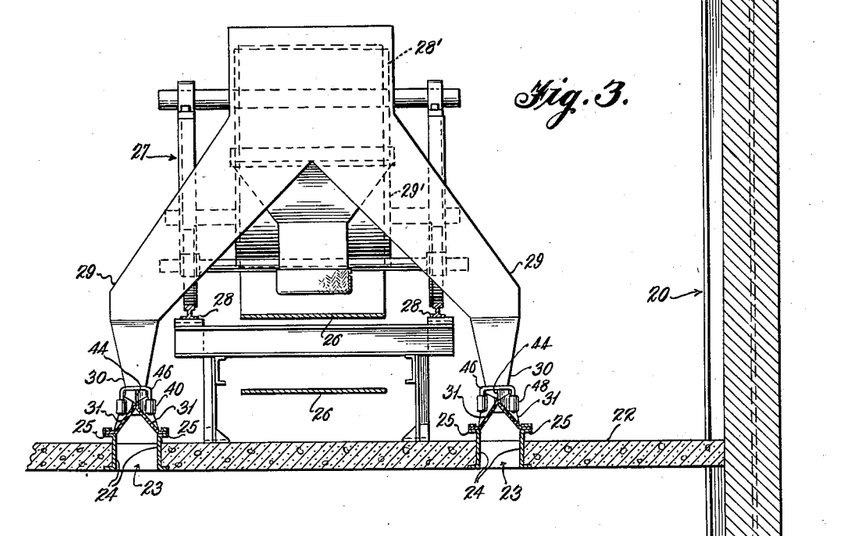
Figure 3 is a partly vertical sectional view and partly end elevational view of a traveling tripper device for a belt conveyor which is arranged to serve a bin or bunker by feeding coal, or the like, through the parallel feed slots or openings.
Figure 4:
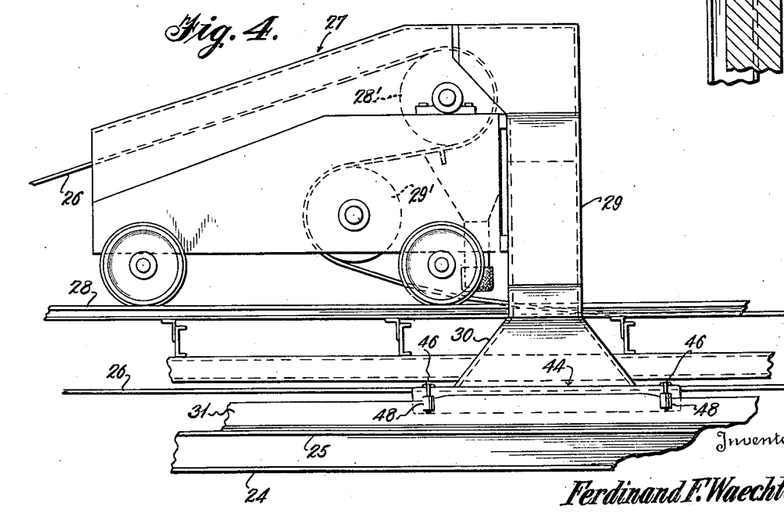
Figure 4 is a detailed side elevational view of the traveling belt conveyor tripper mechanism disclosed in Fig. 3.

Figs. 3 and 4 disclose each bin or bunker opening 23 as having its two longitudinal margins defined by sections of channel stock or curb C's 24. These marginal members are provided with top flanges 25. It is to be understood that this marginal construction is merely illustrative and that other structures may be employed as desired.

Extending lengthwise of the two pairs of bin or bunker openings 23 is a belt conveyor 26. No attempt has been made in the several figures to illustrate belt conveyor idlers which must necessarily be employed for supporting the runs of the conveyor belt. It is to be understood, however, that appropriate idlers will be provided in a commercial installation.

Figs. 2, 3, and 4 disclose a traveling tripper 27 which runs along the suitably supported track rails 28 for serving both pairs of bin slots or elongated openings 23. This traveling tripper 27 is of conventional design and, for that reason, need not be described in detail. It will be sufficient to state that the belt of the conveyor 26 runs over appropriate rolls 28' and 29' for effecting delivery or discharge of the coal, or the like, being transported by the belt conveyor 26, regardless of the travel of the tripper or the location of the tripper with respect to the slots or openings 23. This particular tripper is provided with downwardly and laterally diverging chutes 29 which receive the material discharged from the conveyor belt as it runs over the upper roll 28'. The discharge ends 30 of the chutes 29 are illustrated in Figs. 2, 3, and 4 as being reduced in width and increased in length to provide narrow discharge outlets. These discharge extremities are properly aligned with the openings or slots 23 so that as the tripper traverses the bin openings or slots the material carried by the belt conveyor may be discharged into the bins or bunkers through their feed openings 23. It will be appreciated that where only one line of slots or openings 23 is employed the tripper will be provided with only one laterally extending chute which may extend to either side of the tripper.

Figs. 1 to 4, inclusive, disclose as a part of the bin or bunker structures one form of sealing or closing means for the slots or openings 23. Figs. 5 to 8, inclusive, disclose in detail this particular type of sealing or closing means. The remaining Figures, 9 to 19, inclusive, disclose modified forms of sealing or closing means for bin or bunker slots or elongated openings. In all of these Figs. 5 to 19, inclusive, the bin or bunker cover or floor 22 is merely disclosed as a plate 22a. This, therefore, constitutes a more or less diagrammatic disclosure of the more detailed illustrations provided by Figs. 1 to 4, inclusive. The floor or cover plates 22a are illustrated in Figs. 5 to 19, inclusive, as being provided with flanged, longitudinal margins 24a which diagrammatically represent the channels or curb C's of Fig. 3. It is to be understood from these disclosures that any suitable bin or bunker structures may be provided and that any suitable attachment structure may be employed along the slot margins.

Referring now particularly to Figs. 5 to 8, inclusive, the bin or bunker feed slot or elongated opening 23 is normally closed or sealed by means of the two bands 31 which are suitably secured along their outer longitudinal edges to the marginal flanges 24a by appropriate clamp bars 32 and bolts, or the like, 33. These two bands 31 are formed of a suitable flexible material. It has been determined that belting for belt conveyors constitutes a very satisfactory flexible material from which to form these bands 31. The belting may be of any conventional or usual construction, such as a multiple canvas ply core with a rubber covering.

It will be noted by considering the several figures that the two flexible bands 31 collectively are of greater width than the width of the slot or elongated opening 23. These bands are arranged so that they converge upwardly to lap each other at the apex 34 which is formed by their free longitudinal edge portions. This arrangement of the bands places them somewhat under compression and causes the lapped edge portions to forcefully engage each other for providing an effective seal. In actual practice, it has been found that the lapped edge portions, which form the apex 34, will not always remain in such perfect aligned condition as illustrated in the several figures. In other words, the apex 34 assumes a wavy shape when viewed from above. When this waviness develops or appears, the upper longitudinal edges of the two bands are not in perfect alignment as the edge which forms the inside of a wave peak or top will be positioned below the edge which forms the outside. However, the edge portions of the two bands still snugly engage each other and form a perfect seal.

Figs. 3 and 5 to 7, inclusive, illustrate the flexible bands 31 as converging upwardly, or extending upwardly away from the horizontal plane of the marginal flanges 24a. This arrangement of the bands, naturally, results in leaving openings at the opposite ends of each pair of bands, or at the opposite ends of each slot or opening 23. These end openings, therefore, must be sealed or closed. When a tripper chute serves only a single continuous, or uninterrupted slot or opening 23, the extremity 30 of the chute always will remain in engagement with or travel lengthwise of a single pair of bands throughout the entire travel of the tripper. In such an arrangement, the tripper chute will always stop short of the opposite ends of the pair of bands. The openings provided at the opposite ends of this continuous band arrangement may be closed by fixed or immovable members of appropriate shape in elevation.

Figure 5:
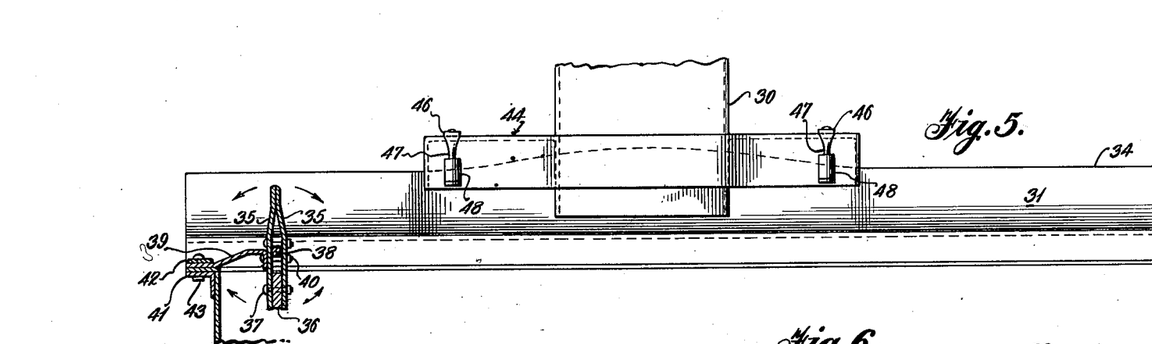
Figure 5 is a fragmentary vertical sectional view of one of the bin or bunker slots or openings disclosed in Figs. 1 to 4, inclusive, with the closing or sealing mechanism embodying this invention operatively associated therewith.
Figures 6, 7, 8:
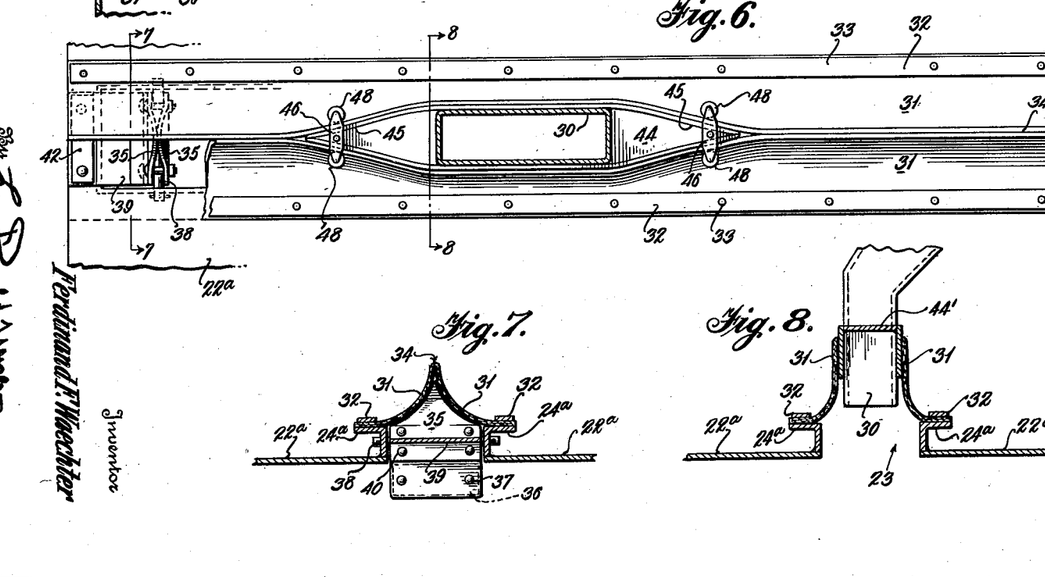
Figure 6 is a plan view of the structure shown in Fig. 5.
Figure 7 is a detail vertical sectional view taken on line 7—7 of Fig. 6.
Figure 8 is a detail vertical sectional view taken on line 8—8 of Fig. 6.

However, when the bands are arranged in aligned pairs with spaces provided between the adjacent ends of the pairs, as is clearly illustrated in Fig. 1, the chute extremity 30 will not always remain in contact with the pairs of bands. The chute extremity will become entirely disconnected from one pair of bands and will be compelled to pick up the adjacent ends of a second pair of bands in moving from one slot or opening 23 to the other. The openings at the ends of the pairs of bands in such an arrangement must be closed by gates, or the like, which are pivoted to allow for passage of the chute extremity 30. A suitable pivoted gate structure is illustrated in Figs. 5 to 7, inclusive. It is to be understood that one of these pivoted gates is provided for each open end of each pair of flexible bands where the bands are not continuous but are interrupted as a result of longitudinal spacing of the aligned slots or openings 23.

These gates may be of any suitable construction, but it has been determined that they may be inexpensively formed of two pieces of canvas belting 35 which are cut to provide the desired shape in elevation, see Fig. 7. The lower, wider portions of these pieces of belting 35 are spaced to receive a weight member 36 which is secured in place by rivets, or the like, 37. The intermediate portions of the two pieces of belting 35 are spaced to accommodate the mounting shaft 38. Fig. 7 discloses this shaft as extending through portions of the marginal flanges 24 in which the shaft ends are journaled. A flexible piece of canvas, or the like, 39 is joined to the gate structure in the vicinity of the shaft 38. Rivets, or the like, 40 may be employed for securing the shaft 38 in place and for attaching the adjacent end portion of the canvas piece 39 to the gate. The remaining end portion of the canvas 39 is secured to a transverse marginal flange 41 of the opening by means of a clamp bar 42 and bolts or rivets 43.

Figs. 5, 6, and 8 disclose the discharge extremity 30 of a traveling tripper chute as being provided with a double pointed plow 44. This plow may be suitably stamped or pressed from sheet metal, of appropriate gauge, to provide the pointed, band spreading end portion 45. Between the end walls of the chute 30 and the peaks of the pointed end portions, the plow is closed as at 44', see Fig. 8. Figs. 5 and 6 disclose each pointed portion of the plow as being provided with a transversely arranged strap 46 which is shaped to provide journal portions 47 at opposite sides of the point. These journal portions have mounted thereon, for rotation relative thereto, the rolls 48 which are arranged to hold the upper longitudinal edge portions of the flexible bands 31 in snug engagement with the side walls of the plow points. These rolls operate to prevent the plow from spreading or separating the lapped edge portions of the flexible bands too far in advance of the leading point of the plow and assure the rapid closing together of the edge portions of the bands in back of or behind the plow. It will be appreciated that the plow and its rolls 48 will operate regardless of the direction of movement of the tripper chute discharge end 30 relative to the length of a bin or bunker slot or opening. It will be understood that these rollers 48, and their supports, may be omitted when using bands 31 having suitable flexibility and a suitable plow 44 having a contour which follows the natural bend assumed by the spreading edges of the bands 31.

Figure 9:
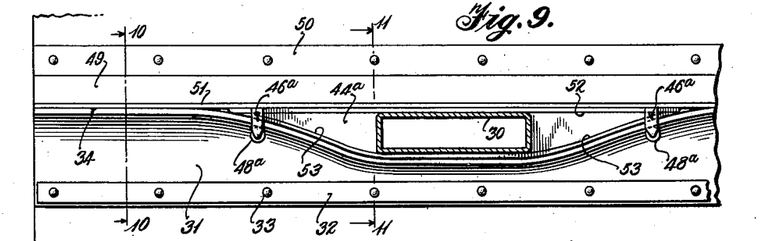
Figure 9 is a view similar to Fig. 6 but illustrates a modified form of sealing or closing means for a bin or bunker slot or elongated opening.
Figure 10:
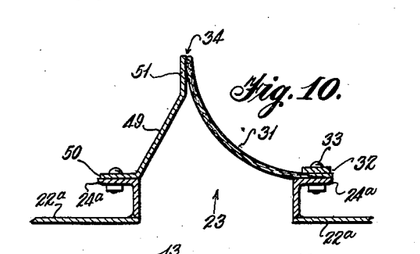
Figure 10 is a detail vertical sectional view taken on line 10—10 of Fig. 9.
Figure 11:
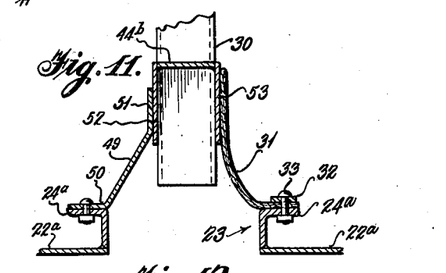
Figure 11 is a detail vertical sectional view taken on line 11—11 of Fig. 9.

In Figs. 9 to 11, inclusive, there is disclosed sealing or closing means for a bin or bunker slot or opening 23 which differs from the structure disclosed in Figs. 5 to 8, inclusive, by employing one flexible band and one stiff band and by providing a plow of proper shape to progressively flex only the flexible band. Otherwise, this form of sealing or closing means is the same as that disclosed in Figs. 5 to 8, inclusive.

In Figs. 9 to 11, the flexible band 31 is secured along its lower longitudinal edge to the marginal flange 24a of the slot or opening 23 by means of a clamp bar 32 and bolts or rivets 33. The stiff band 49 is cut from steel plate of appropriate gage and is shaped to provide a mounting flange 50 which is bolted or riveted to its respective marginal flange 24a. The upper longitudinal edge of the rigid or stiff band 49 is shaped to provide a substantially perpendicularly extending edge portion 51 which is lapped by the free longitudinal edge portion of the flexible band 31 to form a peak 34.

The discharge end portion 30 of the tripper chute is provided with an oppositely pointed plow 44a. In other words, this plow provides oppositely extending points which are flat at the side 52 to engage the portion 51 of the stiff or rigid band 49 and are bent inwardly at their side 53 to spread the flexible band 31 as the plow is moved in opposite directions relative to the length of the opening 23. The opposite points of the plow 44a are provided with straps 46a and rolls 48a to hold the flexible band 31 snugly against the side 53 of the plow points. The pointed portions of the plow 44a are closed, as at 44b, see Fig. 11.

Figures 12, 13, 14:
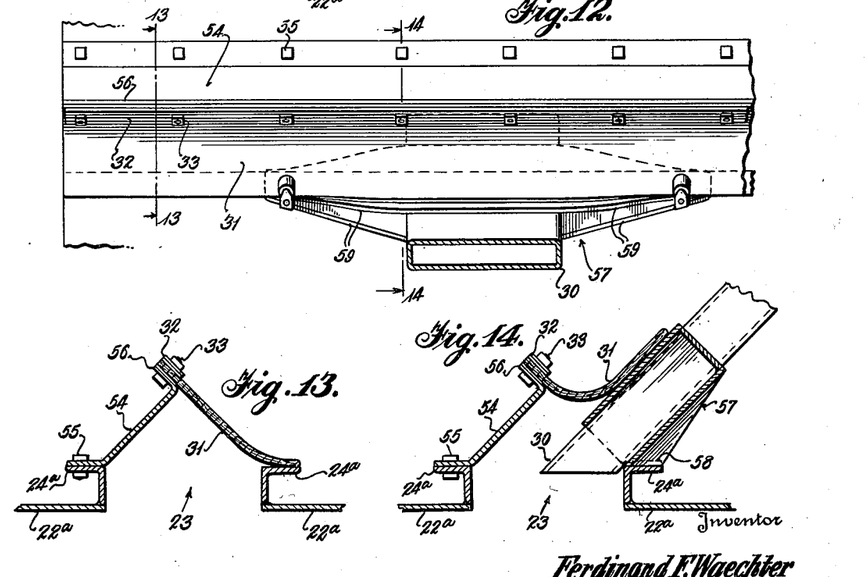
Figure 12 is a view similar to Figs. 6 and 9 but illustrates a further modified form of sealing or closing means.
Figure 13 is a detail vertical sectional view taken on line 13—13 of Fig. 12.
Figure 14 is a detail vertical sectional view taken on line 14—14 of Fig. 12.

Figs. 12 to 14, inclusive, disclose another modified form of closure structure. In this form, a stiff or rigid band 54 is secured by bolts, or rivets 55, to one marginal flange 24a. The upper longitudinal edge portion of this band 54 is flanged at 56 for providing a mounting seat for the longitudinal edge portion of the flexible band 31 which is secured thereto by the clamping bar 32 and the bolts or rivets 33.

The flanged edge portion 56 of the stiff or rigid band 54 is so positioned relative to the remaining marginal flange 24a of the opening 23 and the flexible band 31 is of such a width as to cause the free longitudinal edge portion of the flexible band to lap the adjacent marginal flange 24a of the opening or slot 23, in the manner best illustrated in Fig. 13.

For this form of seal or closure, the extremity 30 of the tripper chute is provided with a plow 57 which is slidable relative to the chute end and is provided with a skid portion 58 which rides on the adjacent marginal flange 24a of the opening or slot 23. The opposite sides 59 of the pointed portions of the plow 57 are appropriately shaped to progressively spread or flex the flexible band 31 as the plow traverses the length of the slot or opening 23 in either direction. The strap and roll structure 46a and 48a, of Fig. 9, is applied to each pointed end of the plow 57, see Fig. 12.

Figure 15:
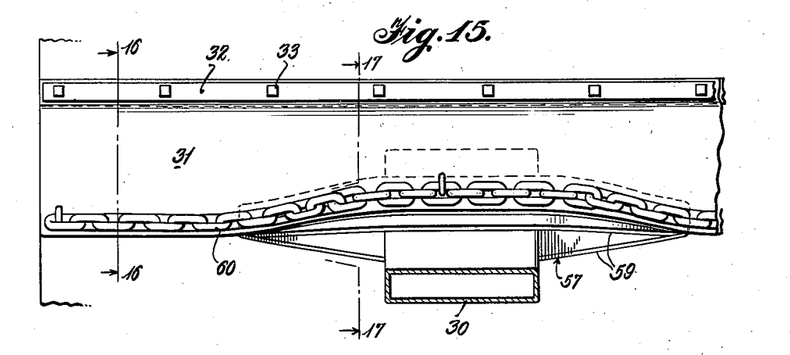
Figure 15 is a view similar to Figs. 6, 9, and 12 but illustrates a still further modified form of sealing or closing means.
Figure 16:
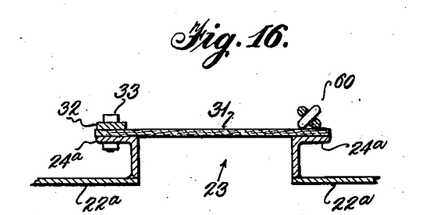
Figure 16 is a detail vertical sectional view taken on line 16—16 of Fig. 15.
Figure 17:
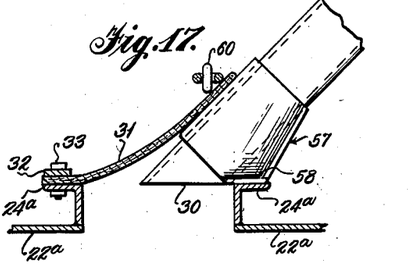
Figure 17 is a detail vertical sectional view taken on line 17—17 of Fig. 15.

In Figs. 15 to 17, inclusive, there is disclosed a still further modified form of sealing or closing means. In this form only one flexible band 31 is employed. No second flexible or stiff band is provided. One longitudinal edge of the flexible band 31 is secured to one marginal flange 24a of the opening 23 by means of the clamp bar 32 and bolts or rivets 33. The remaining longitudinal edge portion of the flexible band 31 is intended to lap the remaining marginal flange 24a of the slot or opening 23. As this flexible band 31 is not compressed by its arrangement with respect to the lapped marginal flange 24a, the free longitudinal edge portion of the band must be weighted to cause it to snugly or tightly engage its marginal flange. It has been determined that a suitable length of chain 60 may be employed as the weighting means. This chain type of weight will be sufficiently flexible to permit the plow, carried by the discharge end of the tripper chute 30 to progressively flex the flexible band away from the marginal flange 24a which it freely laps. The plow for the modification of Figs. 15 to 17, inclusive, is the same as the plow disclosed and described in detail in connection with Figs. 12 and 14. Therefore, the same reference characters will be applied. The only difference is that it is not necessary to employ rolls 48a to engage the free longitudinal edge portion of the flexible band to maintain it in proper engagement with the pointed end portions of the plow 57 because of the use of the chain weight 60.

Figure 18:
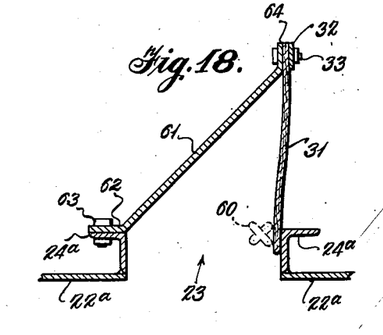
Figure 18 is a detail vertical sectional view illustrating still another modified form of sealing or closing means.
Figure 19:
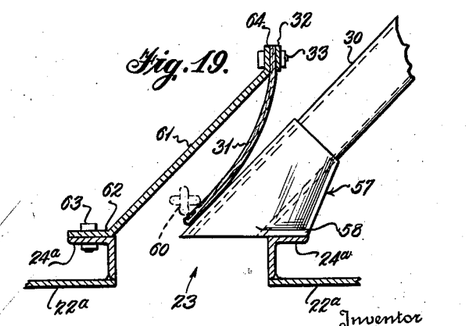
Figure 19 is a view similar to Fig. 18 but illustrates the discharge end of a tripper chute operatively associated with the sealing or closing means while feeding material through the slot or elongated opening.

Figs. 18 and 19 disclose still another modification of the sealing or closing means embodying this invention. In this form, a stiff or rigid band 61 is attached to one marginal flange 24a by means of its angularly bent longitudinal edge portion 62 and the bolts or rivets 63. The upper longitudinal edge portion of this stiff or rigid band 61 is provided with a perpendicularly extending flange portion 64 which, preferably, overlies the remaining marginal flange 24a of the opening 23. A flexible band 31 is attached to this upper flanged portion 64 of the stiff or rigid band 61 by means of a clamp bar 32 and bolts or rivets 33. The free longitudinal edge portion of the flexible band is adapted to lap a perpendicular surface of the marginal flange 24a, as is best illustrated in Fig. 18. A chain type of weight 60 is attached to this free longitudinal edge portion of the flexible band 31 to maintain the edge portion normally in engagement with the perpendicular surface of the marginal flange 24a. The same plow structure 57 is slidably mounted on the discharge end portion 30 of the tripper chute which serves the slot or opening sealed by this type of means.

From a review of the specific disclosures of Figs. 5 to 19, inclusive, it will be seen that each one of the sealing or closing means includes at least one closure band which is formed of flexible material. Furthermore, all of the modifications disclose the use of two bands with the exception of the structure illustrated by Figs. 15 to 17, inclusive. In the forms shown in Figs. 9 to 14, inclusive, 18 and 19, one closure band is formed of flexible material and the other band is formed of such stiff or rigid material as steel sheet or plate. In the sealing or closing structures disclosed in Figs. 5 to 14, inclusive, the one or more flexible sealing bands are maintained in sealing relation at their free longitudinal edges against a band edge portion or a marginal flange as a result of the flexible band or bands being maintained under compression. In the modifications disclosed in Figs. 15 to 19, inclusive, the flexible band is not maintained under compression, but its free longitudinal edge is maintained in sealing relation with a marginal flange by means of a flexible weight.

It will be appreciated that the plow structures will be capable of entering the open ends provided by the closure means because of the pointed extremities of the plows. The plows, also, will progressively flex or spread the one or two flexible bands as the tripper chute traverses the length of a slot or opening 23 to permit the materials to be discharged through the tripper chute into the bin or bunker served by the slot or opening. Although an end gate is illustrated only in connection with the form of sealing or closing means disclosed in Figs. 5 to 8, inclusive, it is to be understood that the same form of end gate is to be provided for each of the remaining forms of sealing or closing means, or a suitable fixed closure for the ends is provided where the sealing bands 31 are continuous and not intermittent in relation to the longitudinal travel of the tripper plow 44.

It is to be understood that the forms of this invention herewith shown and described are to be taken as preferred examples of the same and that various changes in the shape, size, and arrangement of parts may be resorted to without departing from the spirit of the invention or the scope of the subjoined claims.

Having thus described the invention, I claim:

1. The combination with a material admitting slot, or elongated opening, for an enclosure, and a material delivering device adapted to traverse said slot or opening for discharging the material therethrough, of a continuous closure band of flexible material extending along the slot or opening, means for attaching one longitudinal edge of the band to a rigid margin of the slot or opening, a second band associated with the remaining margin of the slot or opening adapted to cooperate with the free longitudinal edge portion of the first band to complete the sealing of the opening, and means carried by the delivering device for progressively deflecting the band as the device traverses the slot or opening to permit material to be fed into the enclosure.

2. The combination with a series of aligned material admitting slots, or elongated openings, for one or more enclosures, and a material delivering device adapted to traverse in either direction the length of any one or more of the slots or openings for discharging material therethrough, of a continuous closure band of flexible material extending lengthwise of each slot or opening, means for attaching one longitudinal edge of the band to a rigid margin of the slot or opening, a second band associated with the remaining margin of the slot or opening adapted to cooperate with the free longitudinal edge portion of the first band to complete the sealing of the opening, and means carried by the delivering device and adapted to pick up the adjacent end of a band and progressively deflect the same as the device traverses its associated slot or opening to permit material to be fed therethrough.

3. The combination with a material admitting slot, or elongated opening, for an enclosure, and a material delivering device adapted to traverse said slot or opening for discharging material therethrough, of a continuous closure band of flexible material extending along the slot or opening, means for attaching one longitudinal edge of the band to a rigid margin of the slot or opening, a pivoted closure gate at each end of the band for closing the ends of the slot or opening, and means carried by the delivery device for progressively deflecting the band as the device traverses the slot or opening to permit material to be fed into the enclosure.

4. The combination with a series of aligned material admitting slots, or elongated openings, for one or more enclosures, and a material delivering device adapted to traverse in either direction the length of any one or more of the slots or openings for discharging material therethrough, of a continuous closure band of flexible material extending lengthwise of each slot or opening, means for attaching one longitudinal edge of the band to a rigid margin of the slot or opening, a pivoted closure gate at each end of each band for closing the ends of the slots or openings, and means carried by the delivery device and adapted to pick up the adjacent end of a band and progressively deflect the same as the device traverses its associated slot or opening to permit material to be fed therethrough.

5. The combination with a material admitting slot, or elongated opening, for an enclosure, and a material delivering device having a discharge chute adapted to traverse said slot or opening for discharging material therethrough, of a continuous closure band of flexible material extending along the slot or opening, means for attaching one longitudinal edge of the band to a rigid margin of the slot or opening, an oppositely pointed plow carried by the discharge chute for progressively deflecting the band in the vicinity of the chute as the device traverses the opening to permit material to be fed into the enclosure, and means traveling with each pointed portion of the plow for holding the band against the plow.

6. The combination with a series of material admitting slots, or elongated openings, for one or more enclosures, and a material delivering device having a discharge chute adapted to traverse in either direction the length of any one or more of the slots or openings for discharging material therethrough, of a continuous closure band of flexible material extending lengthwise of each slot or opening, means for attaching one longitudinal edge of the band to a rigid margin of the slot or opening, an oppositely pointed plow carried by the discharge chute for picking up the adjacent end of each band as the chute travels in either direction relative to said slots or openings, and progressively deflect the said band to permit material to be fed into the associated enclosure, and means traveling with each pointed portion of the plow for holding the band against the side of the plow.

7. The combination with an enclosure having a material admitting slot, or elongated opening, which is flanged at its longitudinal margins, and a material delivering device adapted to traverse said slot or opening for discharging material therethrough, of a continuous closure band for each margin of the slot or opening, at least one of said bands being formed of flexible material, means for attaching one longitudinal edge portion of each band to its respective marginal flange, said bands having a combined width which is greater than the width of the said slot or opening and being arranged to converge upwardly and meet in lapped relation at their free longitudinal edge portions, and means carried by the delivering device for progressively deflecting the flexible band or bands as the device traverses the slot or opening to permit material to be fed into the enclosure.

8. The combination with an enclosure having a material admitting slot, or elongated opening, which is flanged at its longitudinal margins, and a material delivering device adapted to traverse said slot or opening for discharging material therethrough, of a continuous closure band, formed of flexible material, for each margin of the slot or opening, means for attaching one longitudinal edge portion of each band to its respective marginal flange, said bands having a combined width which is greater than the width of the said slot or opening and being arranged to converge upwardly and meet in lapped relation at their free longitudinal edge portions, and means carried by the delivering device for progressively deflecting the flexible bands as the device traverses the slot or opening to permit material to be fed into the enclosure.

9. The combination with an enclosure having a material admitting slot, or elongated opening, which is flanged at its longitudinal margins, and a material delivering device adapted to traverse said slot or opening for discharging material therethrough, of a pair of continuous bands, at least one of which is formed of flexible material having a free longitudinal edge, operatively associated with each other and the said marginal flanges to normally close said slot or opening, and means carried by the delivering device for progressively deflecting the free edge portion of the flexible band or bands as the device traverses the slot or opening to permit material to be fed into the enclosure.

10. The combination with an enclosure having a material admitting slot, or elongated opening, which is flanged at its longitudinal margin, and a material delivering device adapted to traverse said slot or opening for discharging material therethrough, of a pair of continuous bands, one of which is formed of flexible material having a free longitudinal edge and the other of which is formed of relatively stiff material, operatively associated with each other and the said marginal flanges to normally close said slot or opening, and means carried by the delivering device for progressively deflecting the free edge portion of the flexible band as the device traverses the slot or opening to permit material to be fed into the enclosure.

11. The combination with an enclosure having a material admitting slot, or elongated opening, which is flanged at its longitudinal margins, and a material delivering device adapted to traverse said slot or opening for discharging material therethrough, of a band formed of relatively stiff material attached at one of its longitudinal edges to one marginal flange of the slot or opening and projecting laterally toward and upwardly of the other marginal flange, a continuous closure band of flexible material attached at one of its longitudinal edges to the upper longitudinal edge of the stiff band and arranged to lap the second marginal flange of the slot or opening for closing the opening, and means carried by the delivery device for progressively deflecting the free edge portion of the flexible band as the device traverses the slot or opening to permit material to be fed into the enclosure.

12. The combination with an enclosure having a material admitting slot, or elongated opening, and a material delivering device adapted to traverse said slot or opening for discharging material therethrough, of a continuous closure band for each margin of the slot or opening, at least one of said bands being formed of flexible material, means for attaching one longitudinal edge portion of each band to its respective margin, said bands having a combined width which is greater than the width of the said slot or opening and being arranged to converge upwardly and meet in lapped relation at their free longitudinal edge portions, and means carried by the delivering device for progressively deflecting the flexible band or bands as the device traverses the slot or opening to permit material to be fed into the enclosure.

13. The combination with an enclosure having a material admitting slot, or elongated opening, and a material delivering device adapted to traverse said slot or opening for discharging material therethrough, of a continuous closure band, formed of flexible material, for each margin of the slot or opening, means for attaching one longitudinal edge portion of each of said bands to its respective margin, said bands having a combined width which is greater than the width of said slot or opening and being arranged to converge upwardly and meet in lapped relation at their free longitudinal edge portions, and means carried by the delivering device for progressively deflecting the flexible bands as the device traverses the slot or opening to permit material to be fed into the enclosure.

14. The combination with a series of aligned material admitting slots, or elongated openings, for one or more enclosures, and a material delivering device adapted to traverse in either direction the length of any one or more of the slots or openings for discharging material therethrough, of a continuous closure band for each margin of each slot or opening, at least one of said bands for each slot or opening being formed of flexible material, means for attaching one longitudinal edge portion of each band to its respective margin, said bands for each slot or opening having a combined width which is greater than the width of the said slot or opening and being arranged to converge upwardly and meet in lapped relation at their free longitudinal edge portions, and means carried by the delivery device and adapted to pick up the adjacent end of the flexible band or bands and progressively deflect the same as the device traverses the associated slot or opening to permit material to be fed therethrough.

15. The combination with a series of aligned material admitting slots, or elongated openings, for one or more enclosures, and a material delivering device adapted to traverse in either direction the length of any one or more of the slots or openings for discharging material therethrough, of a continuous closure band, formed of flexible material, for each margin of each slot or opening, means for attaching one longitudinal edge portion of each band to its respective margin, said bands having a combined width which is greater than the width of the slot or opening with which they are associated and being arranged to converge upwardly and meet in lapped relation at their free longitudinal edge portions, and means carried by the delivery device and adapted to pick up the adjacent ends of the bands of a slot or opening and progressively deflect the same as the device traverses the slot or opening to permit material to be fed therethrough.

16. The combination with an enclosure having a material admitting slot, or elongated opening, and a material delivering device adapted to traverse said slot or opening for discharging material therethrough, of a continuous closure band for each margin of the slot or opening, at least one of said bands being formed of flexible material, means for attaching one longitudinal edge portion of each band to its respective margin, said bands having a combined width which is greater than the width of the said slot or opening and being arranged to converge upwardly and meet in lapped relation at their free longitudinal edge portions, a pivoted closure gate at each end of each pair of bands for closing the ends of the slot or opening, and means carried by the delivering device for progressively deflecting the flexible band or bands as the device traverses the slot or opening to permit material to be fed into the enclosure.

17. The combination with an enclosure having a material admitting slot, or elongated opening, and a material delivering device adapted to traverse said slot or opening for discharging material therethrough, of a continuous closure band, formed of flexible material, for each margin of the slot or opening, means for attaching one longitudinal edge portion of each band to its respective margin, said bands having a combined width which is greater than the width of the said slot or opening and being arranged to converge upwardly and meet in lapped relation at their free longitudinal edge portions, a pivoted closure gate at each end of the pair of flexible bands for closing the ends of the slot or opening, and means carried by the delivering device for progressively deflecting the flexible bands as the device traverses the slot or opening to permit material to be fed into the enclosure.

18. The combination with an enclosure having a material admitting slot, or elongated opening, and a material delivering device adapted to traverse said slot or opening for discharging material therethrough, of a continuous closure band for each margin of the slot or opening, at least one of said bands being formed of flexible material, means for attaching one longitudinal edge portion of each band to its respective margin, said bands having a combined width which is greater than the width of the said slot or opening and being arranged to converge upwardly and meet in lapped relation at their free longitudinal edge portions, means carried by the delivering device for progressively deflecting the flexible band or bands as the device traverses the slot or opening to permit material to be fed into the enclosure, and means traveling with the delivering device deflecting means for holding the flexible band or bands against the deflecting means.

19. The combination with an enclosure having a material admitting slot, or elongated opening, and a material delivering device adapted to traverse said slot or opening for discharging material therethrough, of a continuous closure band, formed of flexible material, for each margin of the slot or opening, means for attaching one longitudinal edge portion of each band to its respective margin, said bands having a combined width which is greater than the width of said slot or opening and being arranged to converge upwardly and meet in lapped relation at their free longitudinal edge portions, means carried by the delivering device for progressively deflecting the flexible bands as the device traverses the slot or opening to permit material to be fed into the enclosure, and means carried by the deflecting means of the deliverying device for holding the flexible bands against the deflecting means.

20. The combination with a material admitting slot, or elongated opening, for an enclosure, and a material delivering device adapted to traverse said slot or opening for discharging material therethrough, of a pair of bands, at least one of which is continuous and is formed of flexible material having a free longitudinal edge, operatively associated with each other and extending along the slot or opening to normally close the same, and means carried by the delivery device for progressively deflecting the free longitudinal edge of the flexible band or bands as the device traverses the slot or opening to permit material to be fed into the enclosure.

21. The combination with a material admitting slot, or elongated opening, for an enclosure, and a material delivering device adapted to traverse said slot or opening for discharging material therethrough, of a pair of bands, both of which are continuous and are formed of flexible material, operatively associated with each other and extending along the slot or opening to normally close the same but to provide, as a result of the flexibility of said band material, a yieldable entrance, and means carried by the delivery device for progressively deflecting the yieldable entrance formed by the flexible bands as the device traverses the slot or opening to permit material to be fed into the enclosure.

22. The combination with a material admitting slot, or elongated opening, for an enclosure, and a material delivering device adapted to traverse said slot or opening for discharging material therethrough, of a pair of bands, one of which is formed of flexible material having a free longitudinal edge and the other of which is formed of relatively stiff material, operatively associated with each other and extending along the slot or opening to normally close the same, and means carried by the delivery device for progressively deflecting the free edge portion of the flexible band as the device traverses the slot or opening to permit material to be fed into the enclosure.

23. The combination with a series of aligned material admitting slots, or elongated openings, for one or more enclosures, of a material delivering device adapted to traverse in either direction the length of any one or more of the slots or openings for discharging material therethrough, of a pair of bands, at least one of which is continuous and is formed of flexible material having a free longitudinal edge, operatively associated with each other and extending along each slot or opening to normally close the same, and means carried by the delivery device for progressively deflecting the free edge portion of the flexible band or bands as the device traverses the same to permit material to be fed into the enclosure or enclosures.

24. The combination with a series of aligned material admitting slots, or elongated openings, for one or more enclosures, and a material delivering device adapted to traverse in either direction the length of any one or more of the slots or openings for discharging material therethrough, of a pair of bands, both of which are continuous and are formed of flexible material, operatively associated with each other and extending along each slot or opening to normally close the same but to provide, as a result of the flexibility of said band material, a yieldable entrance, and means carried by the delivery device and adapted to pick up the adjacent end a pair of bands and progressively deflect the same as the device traverses the associated slot or opening to permit material to be fed therethrough.

25. The combination with a series of aligned material admitting slots, or elongated openings, for one or more enclosures, and a material delivering device adapted to traverse in either direction the length of any one or more of the slots or openings for discharging material therethrough, of a pair of bands, one of which is continuous and is formed of flexible material having a free longitudinal edge and the other of which is formed of relatively stiff material, operatively associated with each other and extending along each slot or opening to normally close the same, and means carried by the delivery device and adapted to pick up the adjacent end of a flexible band and progressively deflect the same as the device traverses its associated slot or opening to permit material to be fed therethrough.

FERDINAND F. WAECHTER.